(12) United States Patent
Adrian

(10) Patent No.: US 10,963,425 B2
(45) Date of Patent: Mar. 30, 2021

(54) DATA PLACEMENT ON MAGNETIC DATA STORAGE TAPE

(71) Applicant: Microsoft Technology Licensing, LLC, Redmond, WA (US)

(72) Inventor: Jason David Adrian, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 182 days.

(21) Appl. No.: 16/158,860

(22) Filed: Oct. 12, 2018

(65) Prior Publication Data

US 2020/0057813 A1   Feb. 20, 2020

Related U.S. Application Data

(60) Provisional application No. 62/719,531, filed on Aug. 17, 2018.

(51) Int. Cl.
*G06F 16/14* (2019.01)
*G06F 3/06* (2006.01)

(52) U.S. Cl.
CPC .......... *G06F 16/14* (2019.01); *G06F 3/0611* (2013.01); *G06F 3/0653* (2013.01); *G06F 3/0682* (2013.01)

(58) Field of Classification Search
CPC .......... G06F 16/24578; G06F 16/285; G06F 16/9535; G06F 9/5083; G06F 2009/4557; G06F 2212/283; G06F 9/505

USPC .......................................... 707/736
See application file for complete search history.

(56) References Cited

U.S. PATENT DOCUMENTS

| | | | |
|---|---|---|---|
| 6,546,384 B2 | 4/2003 | Shaath et al. | |
| 7,853,762 B2 | 12/2010 | Lee et al. | |
| 8,112,579 B2 | 2/2012 | Imai | |
| 8,307,014 B2 | 11/2012 | Mehrotra et al. | |
| 9,343,111 B2 | 5/2016 | Katagiri et al. | |
| 9,912,752 B1* | 3/2018 | Davis | H04L 67/1097 |
| 2008/0126404 A1* | 5/2008 | Slik | G06F 16/1774 |
| 2010/0306288 A1 | 12/2010 | Stein et al. | |
| 2014/0201213 A1 | 7/2014 | Jackson et al. | |

* cited by examiner

*Primary Examiner* — Hung T Vy
(74) *Attorney, Agent, or Firm* — Alleman Hall Creasman & Tuttle LLP

(57) ABSTRACT

A computing device is provided, including a magnetic data storage tape, a processor, and non-volatile memory operatively coupled to the processor. The non-volatile memory may store instructions executable by the processor to receive a plurality of data files including respective media placement metadata. The instructions may be further executable, for each data file of the plurality of data files, to determine a media placement score based on the media placement metadata of that data file. The instructions may be further executable to determine an order for the plurality of data files based on the respective media placement scores of the data files. The instructions may be further executable to write the plurality of data files to the magnetic data storage tape such that the plurality of data files have the determined order on the magnetic data storage tape.

20 Claims, 9 Drawing Sheets

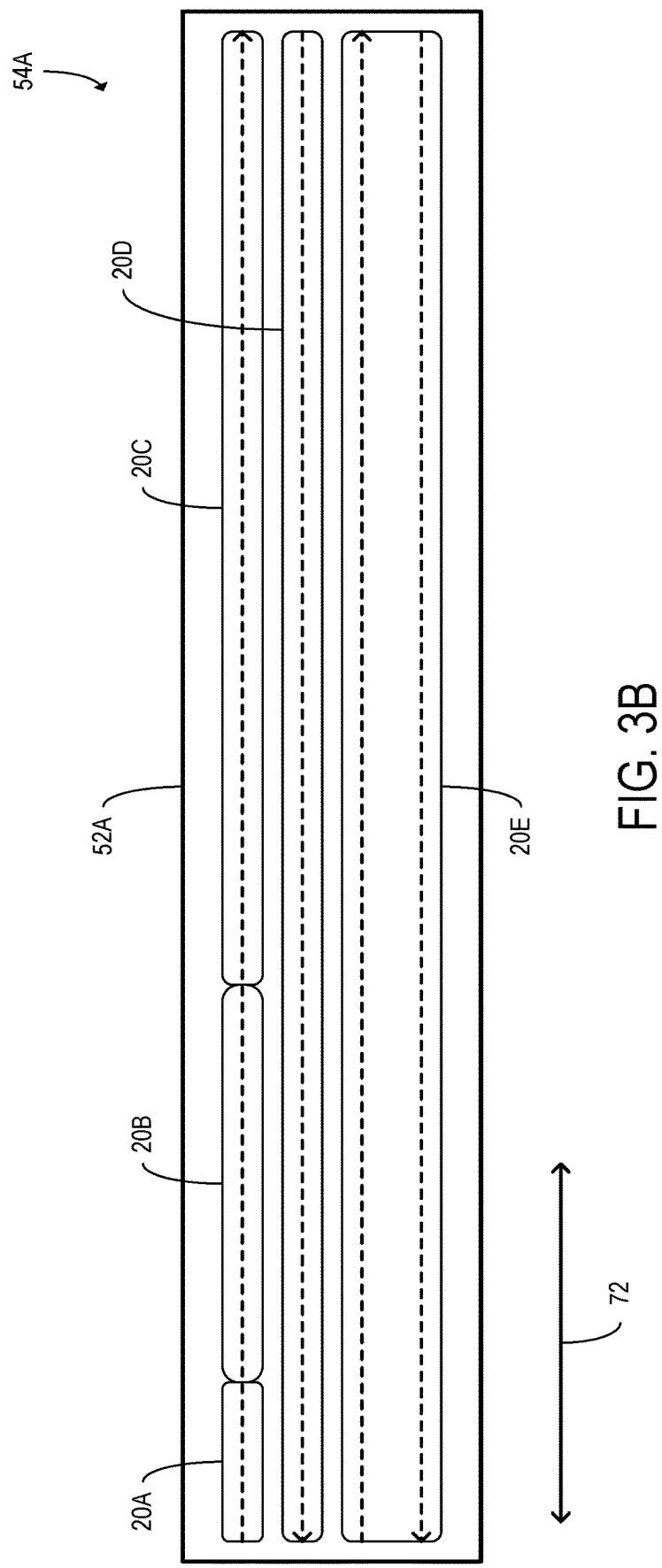

DATA PLACEMENT ON MAGNETIC DATA STORAGE TAPE

CROSS REFERENCE TO RELATED APPLICATIONS

This application claims priority to U.S. Provisional Patent Application Ser. No. 62/719,531, filed Aug. 17, 2018, the entirety of which is hereby incorporated herein by reference for all purposes.

BACKGROUND

When data is stored on magnetic tape, the amount of time required to read the data (read time) is typically much shorter than the amount of time required to scroll the magnetic tape to the position of the file to be read (seek time). For example, existing magnetic tapes may have reading speeds of hundreds of megabytes per second but may take longer than 100 seconds to scroll from the beginning to the end of the tape. Thus, when retrieving data stored on a magnetic tape, most of the time required to retrieve the data is typically spent seeking files.

Retrieving the files may be very time-consuming when a large number of files are stored on magnetic tape. Time-sensitive or mission-critical data, such as a backup copy of a company's production database, may be highly desirable to retrieve quickly. According to existing methods of storing data on magnetic tapes, the files may be distributed between multiple tapes in order to allow the files to be retrieved in a timely manner. However, such methods may be expensive due to the large number of tapes they may require. In addition, retrieval of a file distributed across multiple tapes is bottlenecked by retrieval of the portion of the file that takes the most time to retrieve. For example, if a file is divided between six tapes, five of which each take three minutes to retrieve and one of which takes eight minutes to retrieve, eight minutes would be required to retrieve the entire file. It would therefore be desirable to reduce the seek time for magnetic tape in order to reduce costs associated with retrieving data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of the present disclosure, a computing device is provided, including a magnetic data storage tape, a processor, and non-volatile memory operatively coupled to the processor. The non-volatile memory may store instructions executable by the processor to receive a plurality of data files including respective media placement metadata. The instructions may be further executable, for each data file of the plurality of data files, to determine a media placement score based on the media placement metadata of that data file. The instructions may be further executable to determine an order for the plurality of data files based on the respective media placement scores of the data files. The instructions may be further executable to write the plurality of data files to the magnetic data storage tape such that the plurality of data files have the determined order on the magnetic data storage tape.

BRIEF DESCRIPTION OF THE DRAWINGS

FIG. 3B shows an example partition including a band of a magnetic data storage tape, according to the embodiment of FIG. 3A.

DETAILED DESCRIPTION

Figure 1A:
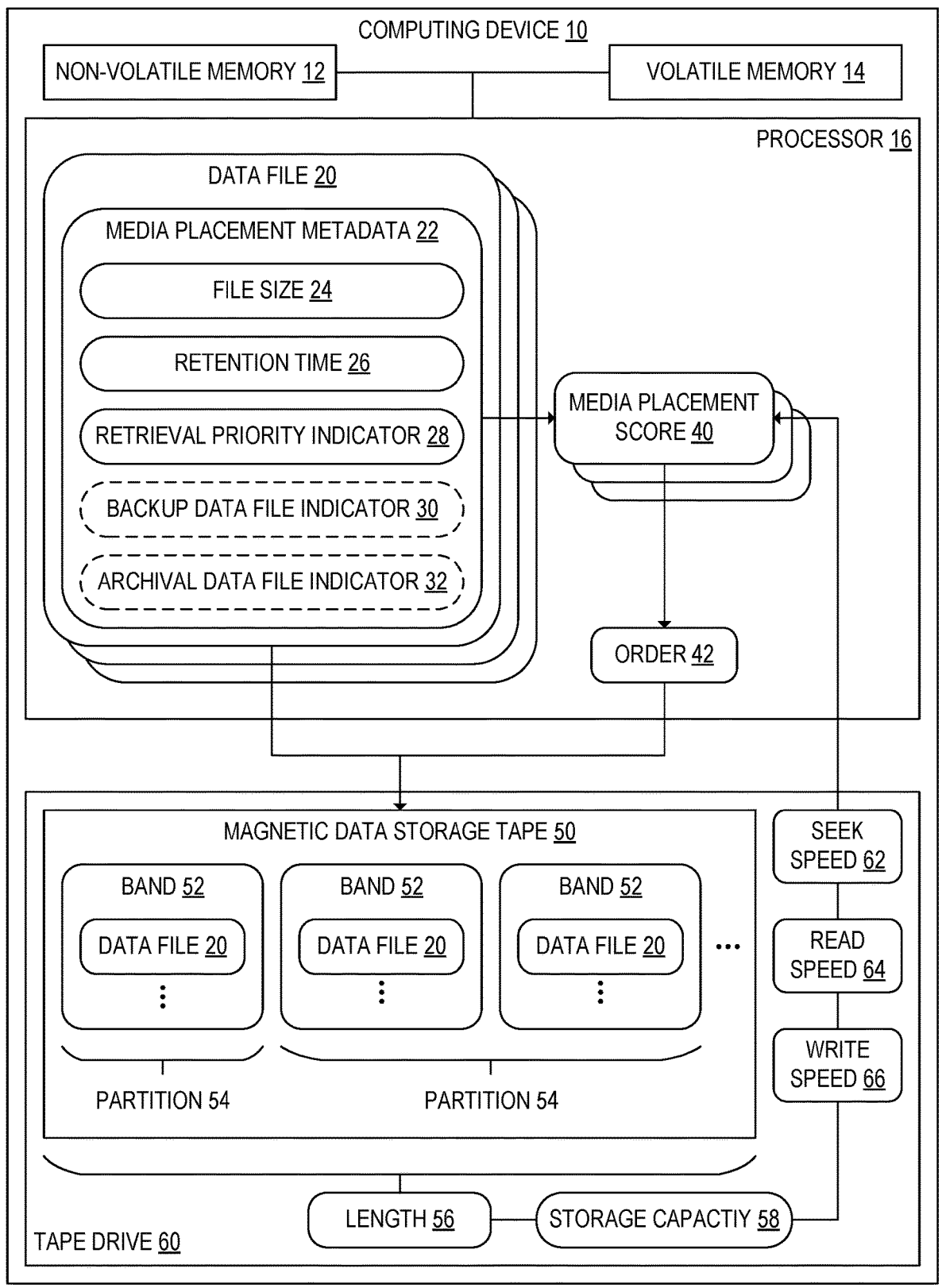
FIG. 1A shows a schematic view of an example computing device, according to one embodiment of the present disclosure.

In order to address the problems discussed above, a computing device 10 is provided, as shown in the example of FIG. 1A. The computing device 10 may include a processor 16 and non-volatile memory 12 operatively coupled to the processor 16. The computing device 10 may further include volatile memory 14 operatively coupled to the non-volatile memory 12 and the processor 16. The computing device 10 may further include one or more input devices and/or one or more output devices. For example, the one or more input devices may include one or more of a touchscreen, a keyboard, a trackpad, a mouse, a button, a microphone, a camera, an accelerometer, and/or one or more other input devices. The one or more output devices may include one or more of a display, a speaker, a haptic feedback device, and/or one or more other output devices.

The computing device 10 may further include a magnetic data storage tape 50. The magnetic data storage tape 50 may be mounted in a tape drive 60 configured to write data to the magnetic tape 50. The tape drive may be further configured to read data from the magnetic tape 50. The tape drive 60 may be operatively coupled to the processor 16 and may be configured to read and/or write to the magnetic tape 50 in response to execution of instructions by the processor 16. Writing data to the magnetic data storage tape 50 is discussed in further detail below.

The non-volatile memory 12 may store instructions executable by the processor 16 to receive a plurality of data files 20. The plurality of data files 20 may be received via the one or more input devices of the computing device 10. In some embodiments, the plurality of data files 20 may be received from another computing device. Each data file 20 of the plurality of data files 20 may include respective media placement metadata 22. The media placement metadata 22 for each data file 20 may include one or more characteristics of the data file 20 based on which the processor 16 may determine a location on the magnetic data storage tape 50 to which to write the data file 20.

In some embodiments, the respective media placement metadata 22 of each data file 20 may include a file size 24 of that data file 20. When reading the magnetic data storage tape 50, scrolling across a large data file 20 typically takes more time than scrolling across a small data file 20. Thus, in order to reduce seek time, it may be desirable to position the data files 20 on the magnetic data storage tape 50 so as to reduce the number of times the tape drive 60 scrolls across a large data file 20.

Additionally or alternatively, the respective media placement metadata 22 of each data file 20 may include a retention time 26 of that data file 20. The retention time 26 refers to a length of time for which the data file 20 is stored on the magnetic data storage tape 50. In embodiments in which the plurality of data files 20 are received from another computing device, the retention time 26 of a data file 20 may be specified in a service level agreement (SLA) between a user of the computing device 10 and a user of the other computing device. The SLA may be a contractual agreement between an owner of the data file 20 and an owner of a data center where the data file 20 is stored.

The respective media placement metadata 22 of each data file 20 may additionally or alternatively include a retrieval priority indicator 28 for that data file 20. For example, the retrieval priority indicators 28 may indicate that a company's customer database has a high retrieval priority, since loss of the customer database may be highly detrimental to the company's day-to-day operations. In contrast, a user's photo album may be assigned a low retrieval priority. In some embodiments, the retrieval priority indicator 28 may be specified in the SLA.

Additionally or alternatively, the respective media placement metadata 22 of each data file 20 may include a respective indicator of whether the data file 20 is a backup data file or an archival data file. Each data file 20 may be indicated to be a backup data file or an archival data file in the respective SLA for that data file 20. When the media placement metadata 22 of a data file 20 includes a backup data file indicator 30, the data file 20 may be likely to be read sequentially in its entirety if it is accessed. In contrast, a data file 20 that includes an archival data file indicator 32 may be likely to be partially read. Thus, compared to a backup data file, an archival data file typically has a longer seek time when read.

Figure 1B:
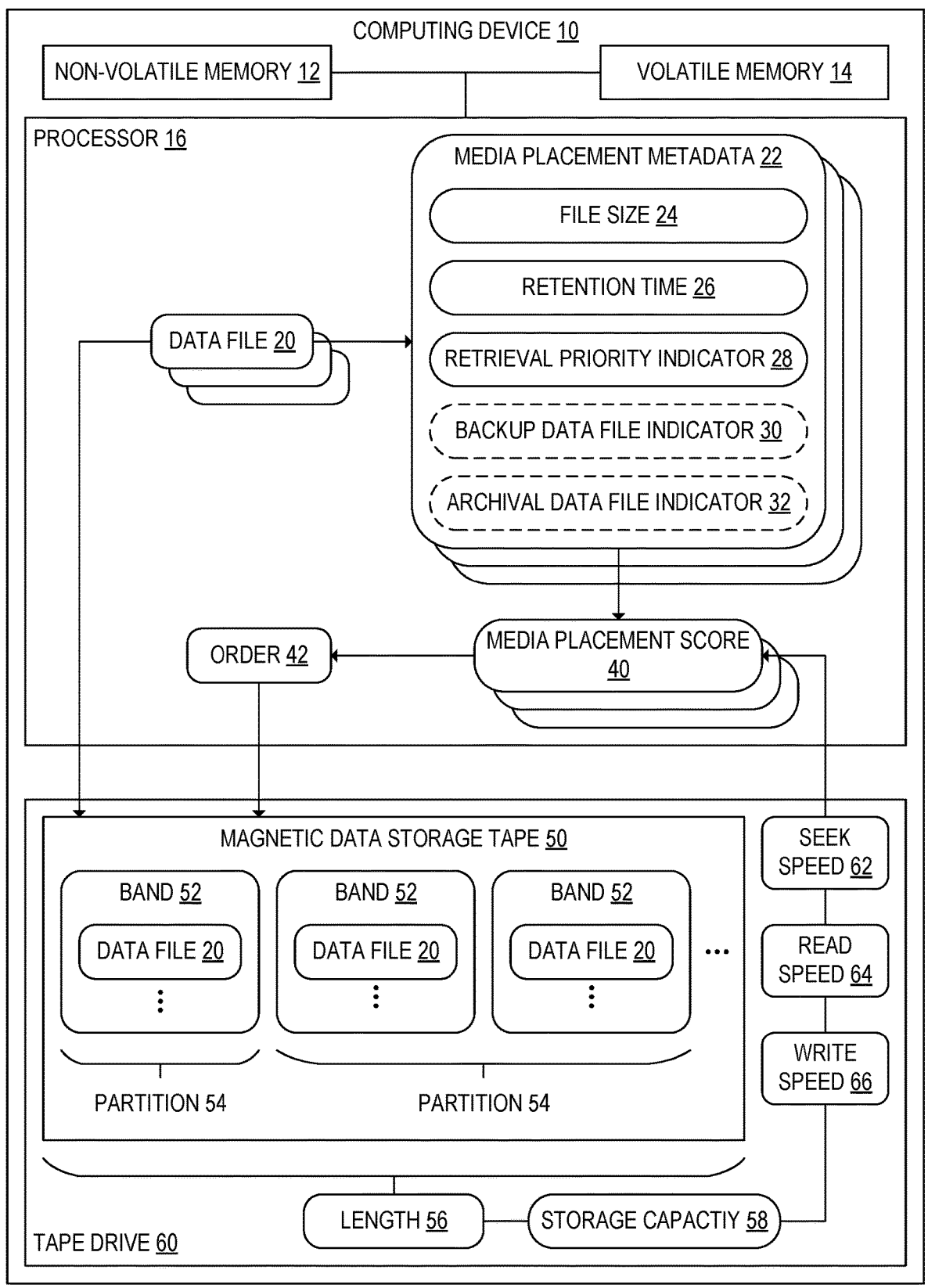
FIG. 1B shows a schematic view of another example computing device, according to another embodiment of the present disclosure.

As shown in FIG. 1A, the respective media placement metadata 22 of each data file 20 may be included in the data file 20. For example, the media placement metadata 22 may be indicated at a beginning or end of the data file 20. In other embodiments, as shown in FIG. 1B, the media placement metadata 22 of a data file 20 may be determined by the processor 16. In such embodiments, the media placement metadata 22 of each data file 20 may be stored in the non-volatile memory 12.

The non-volatile memory 12 may further store instructions executable by the processor 16 to, for each data file 20 of the plurality of data files 20, determine a media placement score 40 based on the media placement metadata 22 of that data file 20. The media placement score 40 of a data file 20 may aggregate the media placement metadata 22 of that data file 20 such that it may be directly compared to other data files 20 of the plurality of data files 20. For example, the media placement score 40 may be an expected retrieval time estimate, which may be determined by multiplying an estimated time required to read the data file 20 by an estimated number of times the data file 20 will be read. Based on the respective media placement scores 40 of the data files 20, the processor 16 may be further configured to determine an order 42 for the plurality of data files 20 on the magnetic data storage tape 50. The plurality of data files 20 may, for example, be arranged in ascending or descending order of their respective media placement scores 40. In some embodiments, a lower media placement score 40 may be associated with a lower estimated cost of storing a data file 20. In other embodiments, a lower media placement score 40 may be associated with a higher estimated cost.

In some embodiments, the media placement score 40 of each data file 20 may be determined based on one or more properties of the tape drive 60 in which the magnetic data storage tape 50 may be mounted. In such embodiments, the respective media placement score 40 of each data file 20 may be based at least in part on one or more of a seek speed 62, a read speed 64, and a write speed 66 of the tape drive 60. For example, the processor 16 may weight file size 24 more heavily in the determination of the respective media placement scores 40 of the data files 20 when the ratio of seek speed 62 to read speed 64 is lower. Additionally or alternatively, in some embodiments, the respective media placement score 40 of each data file 20 may be based at least in part on a length 56 and/or a storage capacity 58 of the magnetic data storage tape 50.

Figure 2:
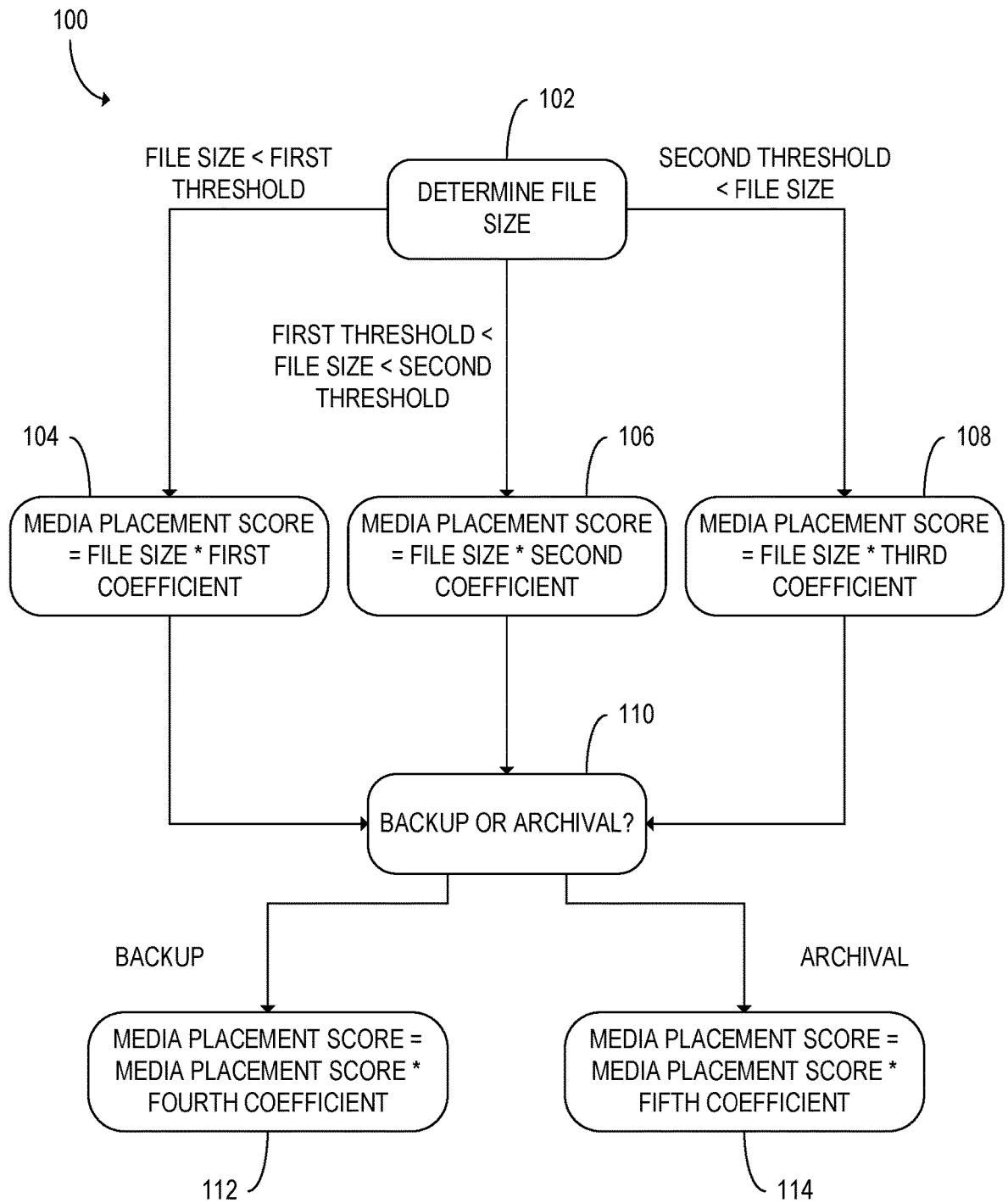
FIG. 2 shows an example algorithm for determining a media placement score of a data file, according to the embodiment of FIG. 1A.

An example algorithm 100 that may be used to determine the media placement score 40 of a data file 20 is shown in FIG. 2. In the example of FIG. 2, a higher media placement score 40 corresponds to a higher expected retrieval time estimate, and therefore a higher cost associated with storing the data file. At step 102 of the algorithm 100, the processor 16 determines the file size 24 of the data file 20. Based on the file size 24 of the data file 20, a weighting factor may be applied to the media placement score 40. If the file size 24 is less than a first threshold (e.g. 1 MB or 2 MB), the algorithm proceeds to step 104, at which the media placement score 40 is set equal to the file size 24 times a first coefficient (e.g. 50 or 100). If the file size 24 is between the first threshold and a second threshold (e.g. 500 MB or 1 GB), the algorithm proceeds to step 106, at which the media placement score 40 is set equal to the file size 24 times a second coefficient (e.g. 2 or 10). If the file size 24 is greater than the second threshold, the algorithm proceeds to step 108, at which the media placement score 40 is set equal to the file size 24 times a third coefficient (e.g. 0.5 or 1). The media placement score 40 may be inversely proportional to the file size 24. In other embodiments, the data file 20 may be categorized by file size 24 using some other number of ranges.

The algorithm 100 then proceeds to step 110, at which the processor 16 determines whether the data file 20 is a backup data file or an archival data file. Based on the determination of whether the data file 20 is a backup data file or an archival data file, the algorithm 100 may apply an additional weighting factor to the media placement score 40. If the data file 20 is a backup data file, the algorithm 100 proceeds to step 112, where the media placement score 40 is multiplied by a fourth coefficient (e.g. 0.5 or 1). If the data file 20 is an archival data file, the algorithm 100 proceeds to step 114, at which the media placement score 40 is multiplied by a fifth coefficient (e.g. 1.5 or 2).

Returning to FIG. 1A, the non-volatile memory 12 may further store instructions executable by the processor 16 to write the plurality of data files 20 to the magnetic data storage tape 50 such that the plurality of data files 20 have the determined order 42 on the magnetic data storage tape 50. In some embodiments, the non-volatile memory 12 may further store instructions executable by the processor 16 to write the respective media placement score 40 for each data file 20 to the magnetic data storage tape 50.

Figure 3A:
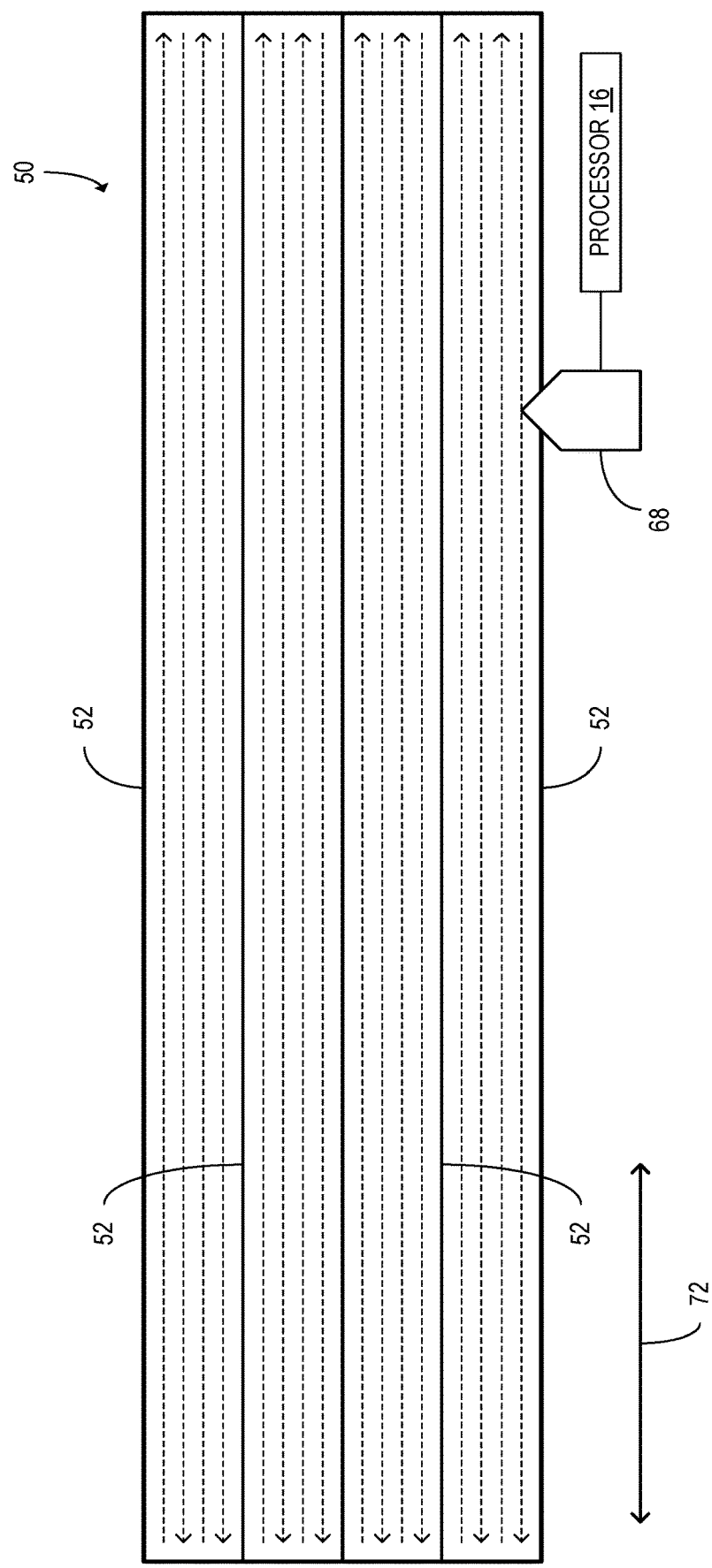
FIG. 3A shows an example magnetic data storage tape, according to the embodiment of FIG. 1A.

In some embodiments, the magnetic data storage tape 50 may include a plurality of bands 52 that extend along a lengthwise dimension 72 of the magnetic storage tape 50, as shown in FIG. 3A. Within each band 52, as shown in FIG. 3A, data may be stored in a linear serpentine configuration. In other embodiments, data may be stored on the magnetic data storage tape 50 in a linear configuration or some other configuration. Data may be written to and/or read from the magnetic data storage tape 50 by one or more read/write heads 68 operatively coupled to the processor 16.

In embodiments in which the magnetic data storage tape 50 includes a plurality of bands 52, the non-volatile memory 12 may further store instructions executable by the processor 16 to write the plurality of data files 20 to the magnetic data storage tape 50 such that, for each data file 20, the band 52 in which that data file 20 is positioned is based on the media placement score 40 of that data file 20. Additionally or alternatively, the data files 20 may be sorted into bands 52 based on the respective media placement metadata 22 of the data files 20 but not on the media placement scores 40. For example, in some embodiments, data files 20 may not be written to, deleted from, or edited within a band 52 without deleting the entire band. In such embodiments, the plurality of data files 20 may be sorted such that for each band 52, each data file 20 in that band 52 has a retention period that begins and ends at the same time. Thus, a data file 20 would not have to be stored for longer than its retention time 26 due to being located on the same band 52 as a data file 20 with a longer retention time 26.

Figure 3C:
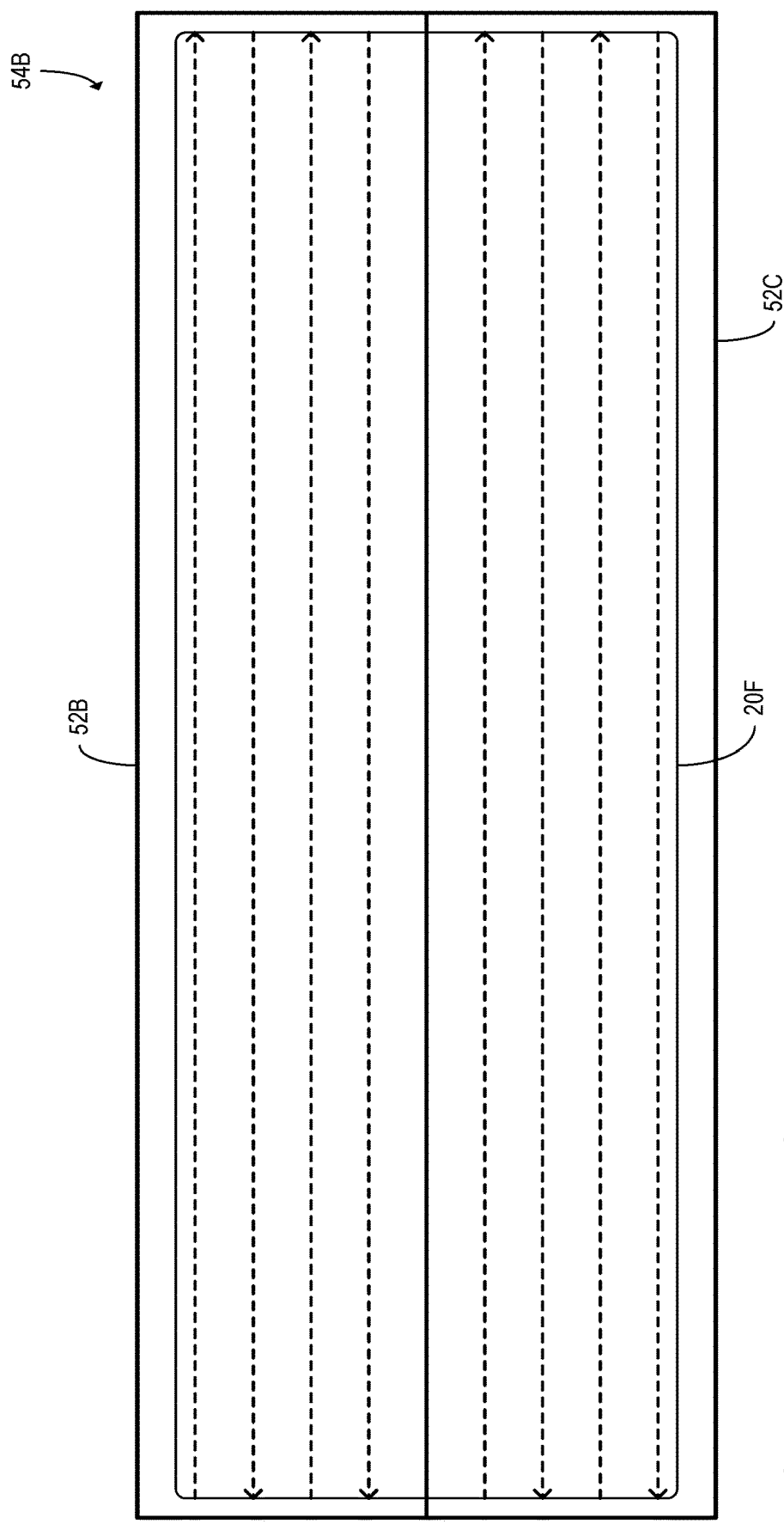
FIG. 3C shows another example partition including two bands of a magnetic data storage tape, according to the embodiment of FIG. 3A.

Returning to FIGS. 1A and 1B, in some embodiments, the non-volatile memory 12 may further store instructions executable by the processor 16 to organize the plurality of data files 20 into a plurality of partitions 54. Each partition 54 may include one or more data files 20 and/or data file sections. The data files 20 may be organized into partitions 54 based on the respective media placement scores 40 of the data files 20. The non-volatile memory 12 may further store instructions executable by the processor 16 to write the plurality of data files 20 to the magnetic data storage tape 50 such that the data files 20 are organized into the plurality of partitions 54. In such embodiments, each partition 54 may include one or more bands 52. FIG. 3B shows an example partition 54A including a single band 52A. In the example of FIG. 3B, the partition 54A stores five archival data files 20A, 20B, 20C, 20D, and 20E in order of increasing file size 24. FIG. 3C shows another example partition 54B including two bands 52B and 52C. The partition 54B stores a single backup data file 20F.

Figure 4:
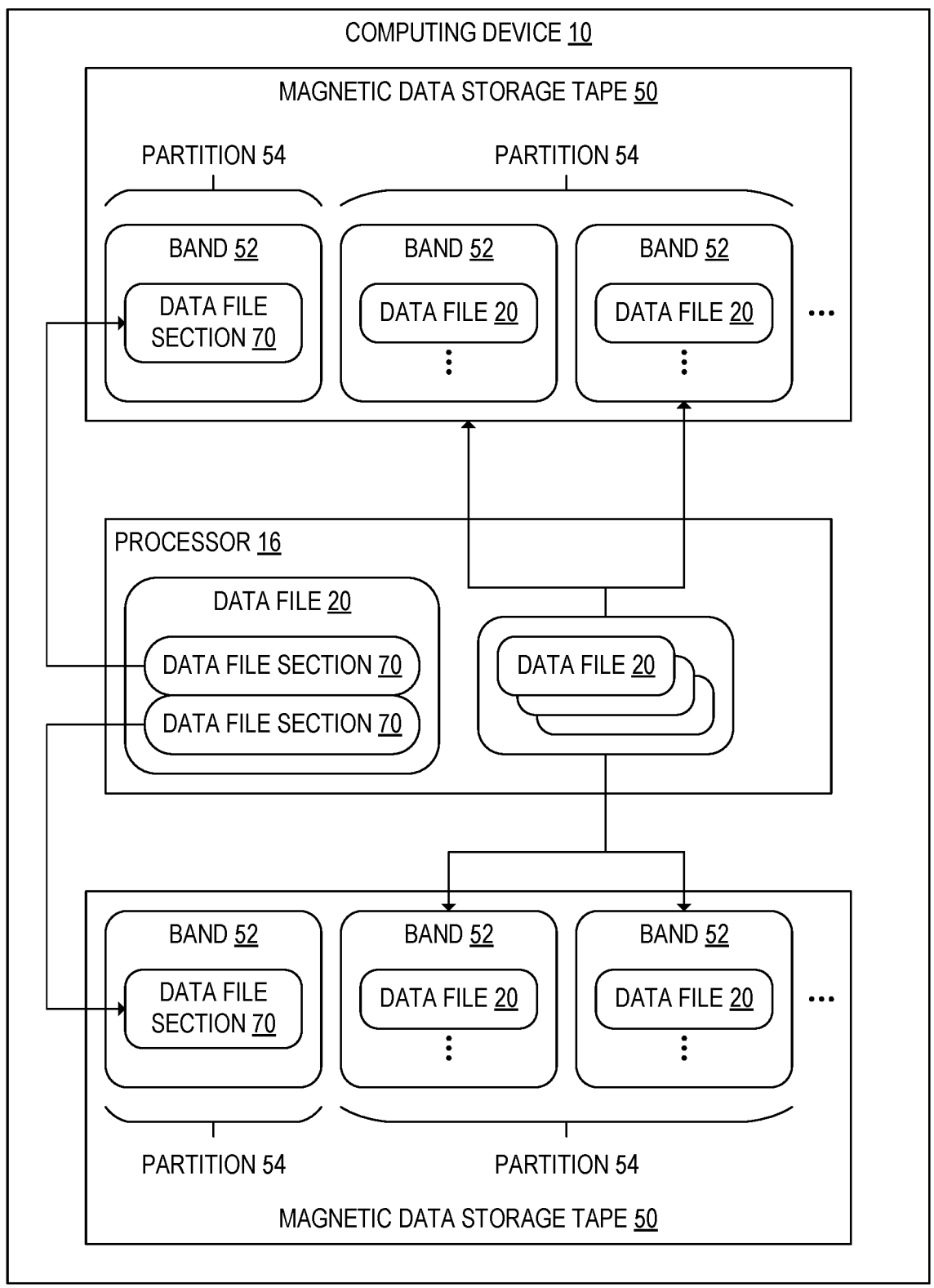
FIG. 4 shows a schematic view of an example computing device including two magnetic data storage tapes, according to the embodiment of FIG. 1A.

In some embodiments, as shown in FIG. 4, the processor 16 may be configured to divide at least one data file 20 of the plurality of data files 20 between a plurality of magnetic data storage tapes 50. The at least one data file 20 may be divided into a plurality of data file sections 70 based at least in part on the media placement metadata 22 of the data file 20, the length 56 and/or storage capacity 58 of the magnetic data storage tape 50, and/or one or more of the seek speed 62, the read speed 64, and the write speed 66 of the tape drive 60. For example, if a data file 20 has a size of 15 TB and a retention time 26 of 5 hours, and each magnetic data storage tape 50 has a storage capacity 58 of 15 TB and can be read in 12 hours, the non-volatile memory 12 may further store instructions executable by the processor 16 to divide the data file 20 into three data file sections each having a file size of 5 TB. Each data file section may be stored on a respective magnetic data storage tape 50. Dividing the data file 20 between a plurality of magnetic data storage tapes 50 may allow the data file 20 to be retrieved more quickly.

In embodiments in which at least one data file 20 is divided between a plurality of magnetic data storage tapes 50, the data file sections 70 may be stored in a plurality of partitions 54 divided among a plurality of magnetic data storage tapes 50. Thus, when it is desirable to access a data file 20 in a shorter period of time than would be feasible if the data file 20 were stored on a single magnetic data storage tape 50, the data file sections 70 may be accessed in parallel. In such embodiments, the partitions 54 that include the data file sections 70 may be located near the respective beginnings of the magnetic data storage tapes 50. One or more data files 20 with respective media placement scores 40 indicating, for example, higher access cost and/or lower access priority may be located at one or more later locations on the magnetic data storage tapes 50. Thus, data file sections 70 of a high-priority data file 20 may be positioned in quickly retrievable positions on the magnetic data storage tapes 50 without wasting storage sp ace.

Figure 5:
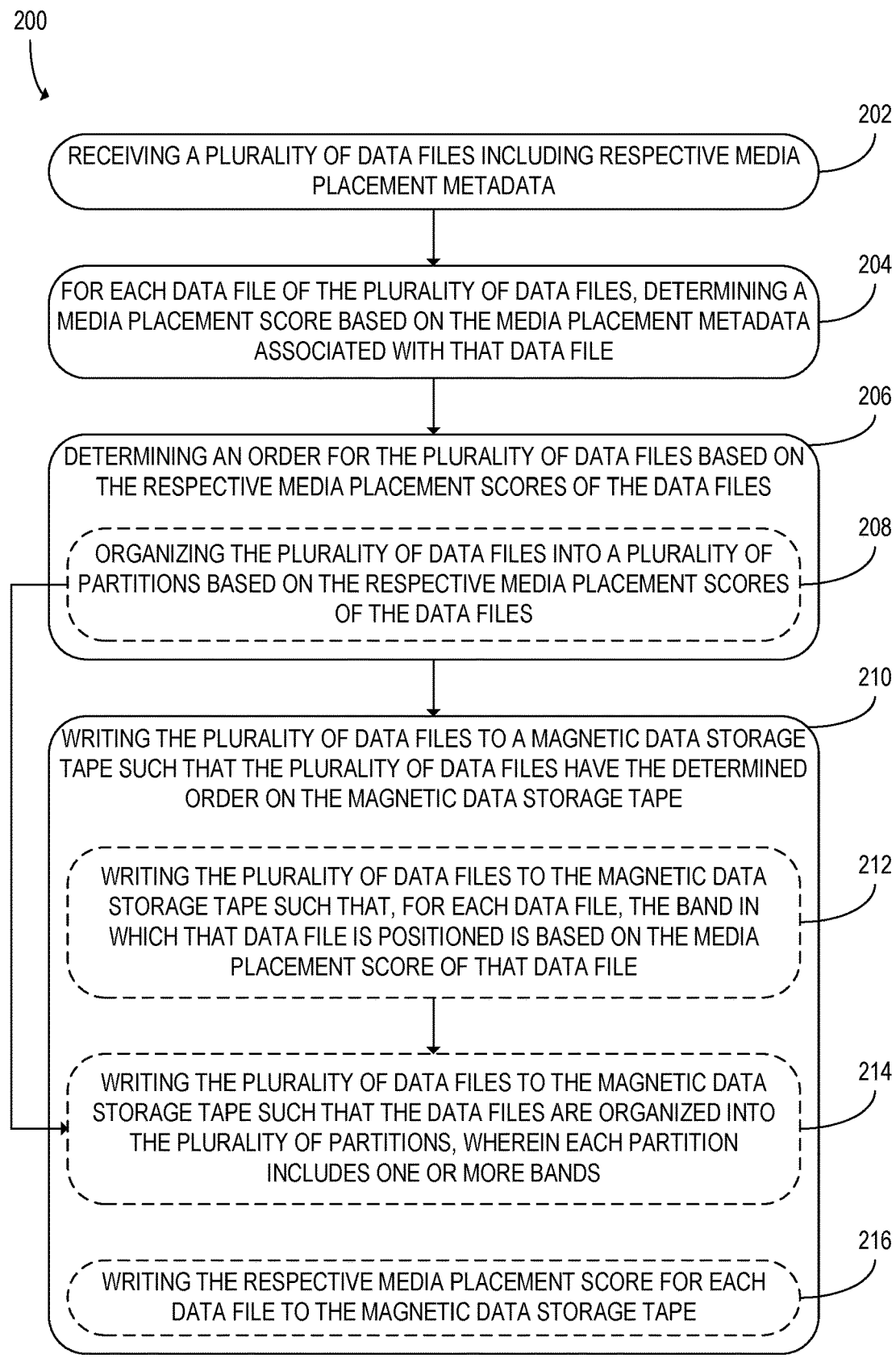
FIG. 5 shows a flowchart of an example method for use with a computing device, according to the embodiment of FIG. 1A.

FIG. 5 shows a flowchart of an example method 200 that may be performed by a computing device. The computing device may be the computing device 10 of FIG. 1A or may alternatively be some other computing device. At step 202, the method 200 may include receiving a plurality of data files including respective media placement metadata. In some embodiments, the respective media placement metadata of each data file may include a retention time of that data file. Additionally or alternatively, the respective media placement metadata of each data file may include a file size of that data file. In some embodiments, the respective media placement metadata of each data file may additionally or alternatively include a retrieval priority indicator for that data file. Additionally or alternatively, the respective media placement metadata of each data file may include a respective indicator of whether the data file is a backup data file or an archival data file.

At step 204, the method 200 may further include, for each data file of the plurality of data files, determining a media placement score based on the media placement metadata associated with that data file. The respective media placement score of each data file may be an expected retrieval time estimate for that data file. In some embodiments, the magnetic data storage tape may be mounted in a tape drive. In such embodiments, the respective media placement score of each data file may be based at least in part on one or more of a seek speed, a read speed, and a write speed of tape drive. The respective media placement score of each data file may additionally or alternatively be based at least in part on a length and/or a storage capacity of the magnetic data storage tape.

At step 206, the method 200 may further include determining an order for the plurality of data files based on the respective media placement scores of the data files. For example, the plurality of data files may be arranged in order of ascending or descending media placement score. In some embodiments, step 206 may further include, at step 208, organizing the plurality of data files into a plurality of partitions based on the respective media placement scores of the data files. In some embodiments, organizing the plurality of data files into a plurality of partitions may include dividing at least one data file into a plurality of data file sections.

At step 210, the method 200 may further include writing the plurality of data files to a magnetic data storage tape such that the plurality of data files have the determined order on the magnetic data storage tape. In some embodiments, the magnetic data storage tape may include a plurality of bands that extend along a lengthwise dimension of the magnetic storage tape. In such embodiments, step 210 of the method 200 may further include, at step 212, writing the plurality of data files to the magnetic data storage tape such that, for each data file, the band in which that data file is positioned is based on the media placement score of that data file. In embodiments in which step 208 and step 212 are performed, the method 200 may further include writing the plurality of data files to the magnetic data storage tape such that the data files are organized into the plurality of partitions, wherein each partition includes one or more bands. In embodiments in which at least one data file is divided into a plurality of data file sections, the respective data file sections may be written to the magnetic data storage tape in separate bands.

Step 210 may additionally or alternatively include writing the respective media placement score for each data file to the magnetic data storage tape. In other embodiments, the respective media placement score for each data file may be stored at the computing device without being written to the magnetic data storage tape.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
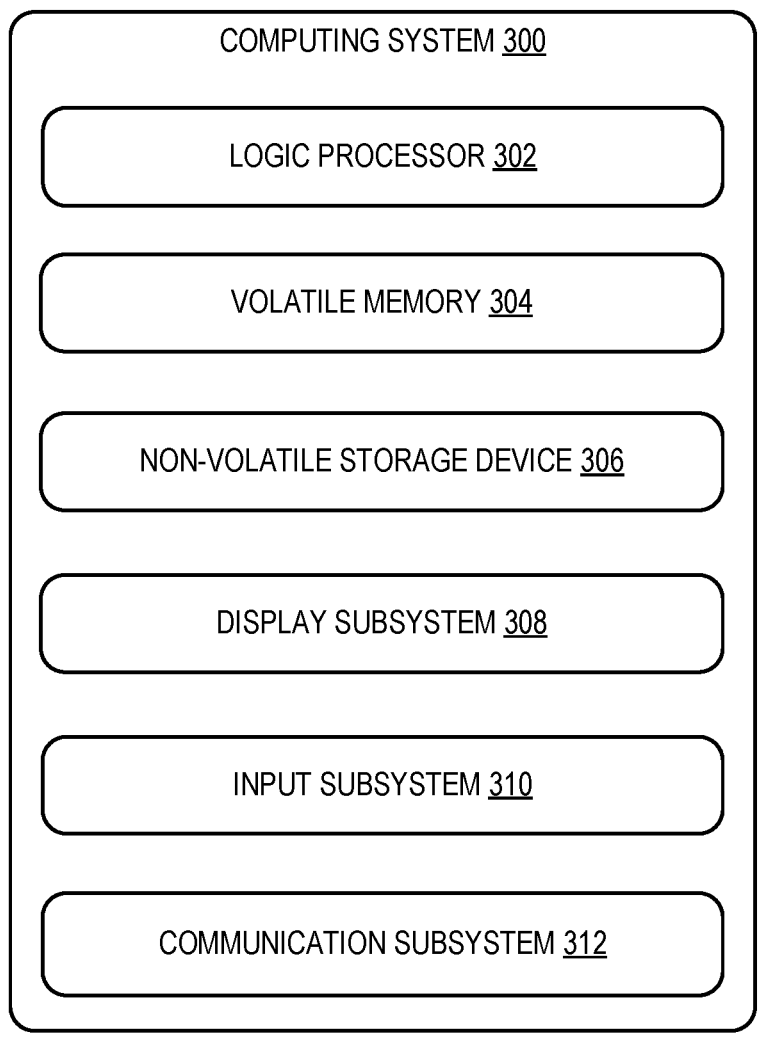
FIG. 6 shows a schematic view of an example computing environment in which the computer device of FIG. 1 may be enacted.

FIG. 6 schematically shows a non-limiting embodiment of a computing system 300 that can enact one or more of the methods and processes described above. Computing system 300 is shown in simplified form. Computing system 300 may embody the computing device 10 described above and illustrated in FIG. 1A. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 6.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

According to one aspect of the present disclosure, a computing device is provided, including a magnetic data storage tape, a processor, and non-volatile memory operatively coupled to the processor and storing instructions executable by the processor. The non-volatile memory may store instructions executable by the processor to receive a plurality of data files including respective media placement metadata. The respective media placement metadata of each data file may include a retention time of that data file. The non-volatile memory may further store instructions executable by the processor to, for each data file of the plurality of data files, determine a media placement score based on the media placement metadata of that data file. The non-volatile memory may further store instructions executable by the processor to determine an order for the plurality of data files based on the respective media placement scores of the data files. The non-volatile memory may further store instructions executable by the processor to write the plurality of data files to the magnetic data storage tape such that the plurality of data files have the determined order on the magnetic data storage tape.

According to this aspect, the respective media placement metadata of each data file may include a file size of that data file.

According to this aspect, the respective media placement metadata of each data file may include a retrieval priority indicator for that data file.

According to this aspect, the respective media placement metadata of each data file may include a respective indicator of whether the data file is a backup data file or an archival data file.

According to this aspect, the respective media placement score of each data file may be based at least in part on a length and/or a storage capacity of the magnetic data storage tape.

According to this aspect, the computing device may further include a tape drive in which the magnetic data storage tape is mounted. The respective media placement score of each data file may be based at least in part on one or more of a seek speed, a read speed, and a write speed of the tape drive.

According to this aspect, the respective media placement score of each data file may be an expected retrieval time estimate for that data file.

According to this aspect, the magnetic data storage tape may include a plurality of bands that extend along a lengthwise dimension of the magnetic storage tape. The non-volatile memory may further store instructions executable by the processor to write the plurality of data files to the magnetic data storage tape such that, for each data file, the band in which that data file is positioned is based on the media placement score of that data file.

According to this aspect, the non-volatile memory may further store instructions executable by the processor to organize the plurality of data files into a plurality of partitions based on the respective media placement scores of the data files. The non-volatile memory may further store instructions executable by the processor to write the plurality of data files to the magnetic data storage tape such that the data files are organized into the plurality of partitions, wherein each partition includes one or more bands.

According to this aspect, the non-volatile memory may further store instructions executable by the processor to write the respective media placement score for each data file to the magnetic data storage tape.

According to another aspect of the present disclosure, a method is provided, including receiving a plurality of data files including respective media placement metadata. The respective media placement metadata of each data file may include a retention time of that data file. The method may further include, for each data file of the plurality of data files, determining a media placement score based on the media placement metadata associated with that data file. The method may further include determining an order for the plurality of data files based on the respective media placement scores of the data files. The method may further include writing the plurality of data files to a magnetic data storage tape such that the plurality of data files have the determined order on the magnetic data storage tape.

According to this aspect, the respective media placement metadata of each data file may include a file size of that data file.

According to this aspect, the respective media placement metadata of each data file may include a retrieval priority indicator for that data file.

According to this aspect, the respective media placement metadata of each data file may include a respective indicator of whether the data file is a backup data file or an archival data file.

According to this aspect, the magnetic data storage tape may be mounted in a tape drive. The respective media placement score of each data file may be based at least in part on one or more of a seek speed, a read speed, and a write speed of tape drive.

According to this aspect, the respective media placement score of each data file may be an expected retrieval time estimate for that data file.

According to this aspect, the magnetic data storage tape may include a plurality of bands that extend along a lengthwise dimension of the magnetic storage tape. The method may further include writing the plurality of data files to the magnetic data storage tape such that, for each data file, the band in which that data file is positioned is based on the media placement score of that data file.

According to this aspect, the method may further include organizing the plurality of data files into a plurality of partitions based on the respective media placement scores of the data files. The method may further include writing the plurality of data files to the magnetic data storage tape such that the data files are organized into the plurality of partitions, wherein each partition includes one or more bands.

According to this aspect, the method may further include writing the respective media placement score for each data file to the magnetic data storage tape.

According to another aspect of the present disclosure, a magnetic data storage tape is provided, including a plurality of data files arranged at respective positions along a lengthwise dimension of the magnetic data storage tape. Each data file may have a media placement score based on media placement metadata associated with that data file. The data files may be arranged on the magnetic data storage tape in order of the respective media placement scores of the data files.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a magnetic data storage tape including a plurality of bands that extend along a lengthwise dimension of the magnetic storage tape;
a processor; and
non-volatile memory operatively coupled to the processor and storing instructions executable by the processor to:
receive a plurality of data files including respective media placement metadata, wherein the respective media placement metadata of each data file includes a retention time, the retention time being a length of time for which the data file is stored on the magnetic data storage tape, of that data file;
for each data file of the plurality of data files, determine a media placement score based on the media placement metadata of that data file;
determine an order on the magnetic data storage tape for the plurality of data files based on the respective media placement scores of the data files, wherein the order specifies placement of data files within each band; and
write the plurality of data files to the magnetic data storage tape such that the plurality of data files have the determined order on the magnetic data storage tape, and such that, for each data file, the band in which that data file is positioned is based on the media placement score of that data file.

2. The computing device of claim 1, wherein the respective media placement metadata of each data file includes a file size of that data file.

3. The computing device of claim 1, wherein the respective media placement metadata of each data file includes a retrieval priority indicator for that data file.

4. The computing device of claim 1, wherein the respective media placement metadata of each data file includes a respective indicator of whether the data file is a backup data file or an archival data file.

5. The computing device of claim 1, wherein the respective media placement score of each data file is based at least in part on a length and/or a storage capacity of the magnetic data storage tape.

6. The computing device of claim 1, further comprising a tape drive in which the magnetic data storage tape is mounted, wherein the respective media placement score of each data file is based at least in part on one or more of a seek speed, a read speed, and a write speed of the tape drive.

7. The computing device of claim 1, wherein the respective media placement score of each data file is an expected retrieval time estimate for that data file.

8. The computing device of claim 1, wherein the non-volatile memory further stores instructions executable by the processor to:
organize the plurality of data files into a plurality of partitions based on the respective media placement scores of the data files; and
write the plurality of data files to the magnetic data storage tape such that the data files are organized into the plurality of partitions, wherein each partition includes one or more of the bands.

9. The computing device of claim 1, wherein the non-volatile memory further stores instructions executable by the processor to write the respective media placement score for each data file to the magnetic data storage tape.

10. The computing device of claim 1, wherein the processor is further configured to:
for each data file of the plurality of data files, write the plurality of data files to the magnetic data storage tape such that each data file in that band has a retention period that begins and ends at the same time.

11. A method comprising:
receiving a plurality of data files including respective media placement metadata, wherein the respective media placement metadata of each data file includes a retention time of that data file, the retention time being a length of time for which the data file is stored on a magnetic data storage tape, the magnetic data storage tape including a plurality of bands that extend along a lengthwise dimension of the magnetic storage tape;
for each data file of the plurality of data files, determining a media placement score based on the media placement metadata associated with that data file;
determining an order on the magnetic data storage tape for the plurality of data files based on the respective media placement scores of the data files, wherein the order specifies placement of data files within each band;
writing the plurality of data files to the magnetic data storage tape such that the plurality of data files have the determined order on the magnetic data storage tape, and such that, for each data file, the band in which that data file is positioned is based on the media placement score of that data file.

12. The method of claim 11, wherein the respective media placement metadata of each data file includes a file size of that data file.

13. The method of claim 11, wherein the respective media placement metadata of each data file includes a retrieval priority indicator for that data file.

14. The method of claim 11, wherein the respective media placement metadata of each data file includes a respective indicator of whether the data file is a backup data file or an archival data file.

15. The method of claim 11, wherein:
the magnetic data storage tape is mounted in a tape drive; and
the respective media placement score of each data file is based at least in part on one or more of a seek speed, a read speed, and a write speed of tape drive.

16. The method of claim 11, wherein the respective media placement score of each data file is an expected retrieval time estimate for that data file.

17. The method of claim 11, further comprising:
organizing the plurality of data files into a plurality of partitions based on the respective media placement scores of the data files; and
writing the plurality of data files to the magnetic data storage tape such that the data files are organized into the plurality of partitions, wherein each partition includes one or more of the bands.

18. The method of claim 11, further comprising writing the respective media placement score for each data file to the magnetic data storage tape.

19. The method of claim 11, wherein writing the plurality of data files includes:
for each data file of the plurality of data files, writing the plurality of data files to the magnetic data storage tape such that each data file in that band has a retention period that begins and ends at the same time.

20. A computing device comprising:
a magnetic data storage tape including a plurality of bands that extend along a lengthwise dimension of the magnetic storage tape;
a processor; and
non-volatile memory operatively coupled to the processor and storing instructions executable by the processor to:
receive a plurality of data files including respective media placement metadata, wherein the respective media placement metadata of each data file includes a retention time, the retention time being a length of time for which the data file is stored on the magnetic data storage tape, of that data file;
for each data file of the plurality of data files, write the plurality of data files to the magnetic data storage tape such that, for each data file, the band in which that data file is positioned is based on the media placement score of that data file, and such that each data file in that band has a retention period that begins and ends at the same time.

* * * * *